Jan. 5, 1926.  
R. M. SMYTHE  
PIE PLATE  
Filed August 2, 1923
1,568,696
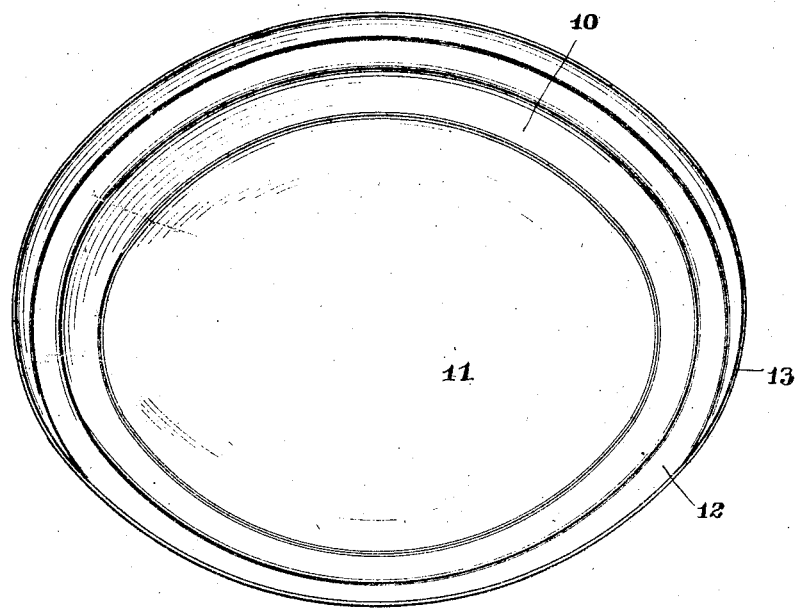
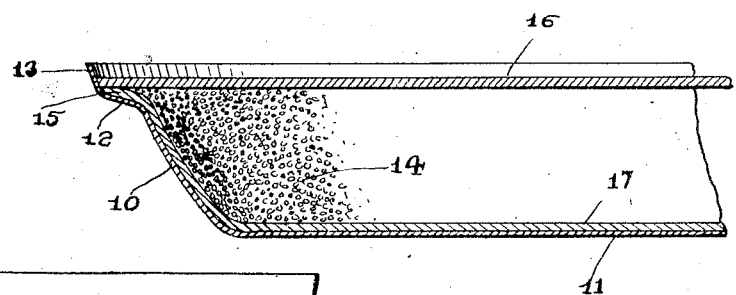
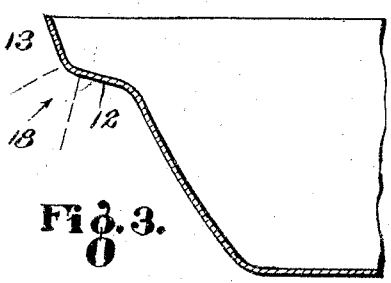
Fig.2.
Fig.3.
Inventor  
Richard M. Smythe,
By Eccleston & Eccleston  
Attorneys Patented Jan. 5, 1926.

1,568,696

UNITED STATES PATENT OFFICE.

RICHARD M. SMYTHE, OF BROOKLYN, NEW YORK, ASSIGNOR TO HENRY M. BLACK, OF NEW YORK, N. Y.

PIE PLATE.

Application filed August 2, 1923. Serial No. 655,238.

REISSUED

*To all whom it may concern:*

Be it known that I, RICHARD M. SMYTHE, a citizen of the United States, residing at Brooklyn, in the county of Kings and State of New York, have invented certain new and useful Improvements in Pie Plates, of which the following is a full, clear, and exact description.

The baking of fruit pies has not heretofore been satisfactory, because of the juice boiling out between the top and bottom crusts, and not only becoming a loss, but also mussing the oven. Because of these discouraging difficulties the baking of fruit pies is but little practiced.

It has been the custom in the present art to insert through the crust a tubular paper or cardboard vent to tend to prevent the steam from forcing the juice out between the upper and lower crusts of the pie, with the resultant loss of juice and deterioration in the quality of the pie, and to reduce the annoyance of the dripping of the juice upon the hot stove or oven floor.

It is an object of the present invention to provide a pie plate of such construction and configuration as will overcome the foregoing difficulties without the necessity of resorting to the aforesaid venting means.

A further object of the invention resides in so constructing such a pie plate as will permit of the ready removal of the pie therefrom without mutilation.

Other objects and advantages of the invention will be apparent from the following description when taken in connection with the accompanying drawings, in which:

Figure 1 is a perspective view of a pie plate constructed in accordance with the present improvements, Figure 2 is a sectional view of a portion thereof, and Fig. 3 is a corresponding view of the same shown on a larger scale.

Referring to the drawings more in detail, the bottom of the pie plate is designated by the numeral 11 and its slightly concaved side wall by the numeral 10. Inclined upwardly from the upper edge of the side wall 10 is a border flange or brim 12, while flared outwardly therefrom is a rim 13, said flange or brim 12 and said rim 13 being run together by means of a distinct fillet 18, which I indicate more clearly in Fig. 3, wherein the two dotted lines aid in identifying the location of the fillet.

The border flange or brim 12 has a pronounced upward inclination and merges into the side wall 10 on a downwardly slanting convexly curved juncture zone, whence said side wall is continued downwardly and inwardly on a gradual slope. The inclined flange or brim 12 forms an inclined seat for the peripheral portions of the lower crust and allows the pie-filling an opportunity to extend partly over said seat between the upper and lower crusts, thus producing a rim on the pie sufficient to confine the filling but without said rim being a dense mass of crust, such as is frequently found on pies. The lower crust or the dough therefor takes the inclination of the flange or brim 12 and is engaged only at its outer edge portions by the upper crust. The flange or brim 12 by having the inward and downward inclination and by merging on a downwardly slanting convex curvature into the gradually sloping side wall 10, imparts to the pie a distinctive rim formation and enables the convenient removal of the pie from the plate. The pie plate is circular, as usual.

In Figure 2 of the drawing I have shown a bottom crust 17 in position with the filling 14 therein, the upper edge 15 of the lower crust resting on the brim portion 12 of the plate. At 16 is indicated the top crust of the pie having its outer edge attached in the usual manner to the edge 15 of the lower crust.

In the operation of the device, the dough having been rolled out, the pie plate is inverted over the sheet of dough and the upper crust cut therefrom. This disk will form the upper crust 16 of the pie, but, of course, is not put in place until after the lower crust is put in the plate and trimmed off around the edges in the well known manner. The filling 14 is then inserted and the upper crust applied, as indicated in Figure 2, with its edge in engagement with the edge 15 of the lower crust, both edges being united and supported on the brim or flange 12.

Should any juices escape through the edges of the upper and lower crusts it will be obvious that they will be prevented from running onto the stove or oven floor by means of the rim 13 which will direct them backwardly onto the top of the pie.

By providing the slight depression or concavity in the wall 10 and by flaring outwardly the rim portion 13 and brim 12, it is obvious that this particular construction of pie plate will in no way interfere with the removal of the pie, inasmuch as the knife may readily be inserted beneath the edges of the pie crust and then pass down below the body of the pie without damage thereto.

What I claim as new and desire to secure by Letters Patent is:

A pie plate comprising a circular bottom a downwardly and inwardly sloping side wall, an upwardly and outwardly inclined border flange or brim extending from the upper portion of said side wall and an upwardly and outwardly flaring rim at the outer edge of said flange or brim, said inclined flange or brim merging into said side wall on a downwardly slanting convexly curved juncture zone, and said flange or brim and said rim being run together by means of a distinct fillet.

RICHARD M. SMYTHE.